(12) United States Patent
Alnås et al.

(10) Patent No.: US 8,020,157 B2
(45) Date of Patent: Sep. 13, 2011

(54) DEPENDENCY NOTIFICATION

(75) Inventors: Svante Alnås, Lund (SE); Angana Ghosh, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1214 days.

(21) Appl. No.: 11/624,532

(22) Filed: Jan. 18, 2007

(65) Prior Publication Data
US 2007/0198975 A1    Aug. 23, 2007

Related U.S. Application Data

(60) Provisional application No. 60/759,645, filed on Jan. 18, 2006.

(51) Int. Cl.
*G06F 9/44*    (2006.01)
(52) U.S. Cl. ........ 717/168; 717/169; 717/171; 717/174; 717/176
(58) Field of Classification Search .................. 717/168, 717/174
See application file for complete search history.

(56) References Cited

U.S. PATENT DOCUMENTS

| | | | |
|---|---|---|---|
| 6,626,953 B2 * | 9/2003 | Johndrew et al. | 715/234 |
| 7,062,765 B1 * | 6/2006 | Pitzel et al. | 717/177 |
| 2003/0005426 A1 * | 1/2003 | Scholtens et al. | 717/169 |
| 2004/0034850 A1 | 2/2004 | Burkhardt et al. | |
| 2005/0034115 A1 * | 2/2005 | Carter et al. | 717/173 |
| 2005/0144616 A1 * | 6/2005 | Hammond et al. | 717/173 |
| 2005/0228847 A1 | 10/2005 | Hayes, Jr. | |
| 2005/0257209 A1 * | 11/2005 | Adams et al. | 717/168 |

FOREIGN PATENT DOCUMENTS
EP    1 487 179 A    12/2004

OTHER PUBLICATIONS

OMA: "OMA Device Management Standardized Objects Candidate Version 1.2 ? Jun. 7, 2005, Open Mobile Alliance OMA-TS-DM-StdObj-V1_2-20050607-C" OMA, [Online] Jun. 7, 2005, XP002436375. Retrieved from the Internet: URL:http://member.openmobilealliance.org/ftp/public_documents/DM/Permanent_documents/OMA-TS-DM=StdObj-V1_2-20050607-C.zip>.
"DM Connectivity Management Objects", http://www.openmobilealliance.org/ftp/Public_documents/TP/Permanent_documents/OMA-WID_0123-ConnectivityMO-V1_0-20051004-A.zip, OMA, Oct. 7, 2005.
Open Mobile Alliance: "SCOMO Architecture, Draft Version 1.0—Dec. 13, 2005, OMA-AD-SCOMO-V1_0-20051213-D" OMA, [Online], Dec. 13, 2005, XP002436260. Retrieved from the Internet: URL:http://member.openmobilealliance.org/ftp/public_documents/DM/SCOMO/Permanent_documents/OMA-AD-SCOMO-V1_0-20051213-D.zip>.
PCT International Search Report, mailed Jun. 20, 2007, in connection with International Application No. PCT/US2007/060716.
PCT Written Opinion, mailed Jun. 20, 2007, in connection with International Application No. PCT/US2007/060716.

* cited by examiner

*Primary Examiner* — Thomas K Pham
(74) *Attorney, Agent, or Firm* — Potomac Patent Group PLLC

(57) ABSTRACT

Communication devices that include one or more software components can determine whether a software component is missing, notify a computer server of a software component determined as missing, and request a download of the missing software component to the device.

17 Claims, 3 Drawing Sheets

DEPENDENCY NOTIFICATION

This application claims the benefit of U.S. Provisional Patent Application No. 60/759,645 filed on Jan. 18, 2006, the content of which is incorporated here by reference.

BACKGROUND

This application relates to communication systems, and more particularly to communication systems having user equipment configurable with different software components.

Today, several actors are involved in managing the software in a user equipment (UE), such as a mobile telephone or other communication device in a radio communication system. The software can be applications, services, and modules, including the operating system (OS), stored in and used by the UE. The device manufacturer completes a working software release in the UE at the time the device is manufactured. Later on, an end user may download to the UE software applications etc. from different sources via, for example, the Internet. The UE manufacturer, the system operator, and/or an authorized third party, depending on business agreements, may also remotely update part or all of the working software release.

After such an update, some of the UE's applications may no longer work because there exist dependencies between applications in devices such as UEs. The end user may also download an application that depends on a specific version of a software module that is not or is no longer present in the device, and then such an application will most likely not run. To conserve the limited memory resources available to most UEs, multiple versions of a module are typically not retained in UE memory.

The Open Mobile Alliance (OMA) has developed specifications for Device Management (DM) in communication devices, and versions 1.1.2 and 1.2 of those specifications define a protocol for managing configuration, data, and settings in communication devices. OMA standards and other information are available at http://www.openmobilealliance.org.

DM relates to management of UE configuration and other Management Objects (MOs) of UEs from the point of view of different DM Authorities, and includes, but is not restricted to, setting initial configuration information in UEs, subsequent updates of persistent information in UEs, retrieval of management information from UEs, and processing events and alarms generated by UEs. Using such DM, third parties can configure UEs on behalf of end users. A third party, such as a network operator, service provider, and corporate information management department, can remotely set parameters, troubleshoot terminals, and install or upgrade software. For example, an MO may be written according to SyncML, which is a mark-up language specification of an XML-based representation protocol, synchronization protocol, and DM protocol, transport bindings for the protocols, and a device description framework for DM.

A UE can, for example, use a Connectivity MO for application-independent settings to connect to a network, such as a wireless application protocol (WAP) network. A Connectivity MO for such a network would provide connectivity information that relates to the parameters and means needed to access the WAP infrastructure, including network bearers, protocols, Network Access Point (NAP) addresses, and proxy addresses. Connectivity MOs are described in "DM Connectivity Management Objects", http://www.openmobilealliance.org/ftp/Public_documents/TP/ Permanent_documents/ OMA-WID_01 23-ConnectivityMO-V1_0-20051004-A.zip, OMA (Oct. 7, 2005).

A WAP proxy is an endpoint for the wireless transport protocol (WTP), the wireless session protocol (WSP), and the wireless transport layer security (WTLS) protocol, as well as a proxy that is able to access WAP content. A WAP proxy can have functionality such as that of, for example, a wireless session protocol (WSP) proxy or a wireless telephony application (WTA) proxy. A physical proxy is a specific address with proxy functionality, e.g., an internet protocol (IP) address plus port for an IP-accessible proxy, and a short message entity (SME)-address plus port for a proxy accessible via the short message service (SMS). A logical proxy is a set of physical proxies that may share the same WSP and WTLS context (shared session identification value space).

According to OMA specifications, a Connectivity MO enabler handles management of wireless data connectivity by specifying a set of DM object schema that may be exposed by a DM Client and targeted by a DM Server. The object schema have three parts: a top level management object that is bearer-neutral; a set of bearer-specific parameters; and a sub-tree for exposing vendor-specific parameters. Connectivity parameters bootstrapped using Client Provisioning (CP) can be subsequently addressed and managed through the DM Server, which can add new proxies and NAPs using a standardized DM package. Provisioning is the process by which a client, such as a WAP client in a device, is configured, and generally covers both over the air (OTA) provisioning and other provisioning, e.g., by a subscriber identity module (SIM) card.

As depicted in FIG. 1, a DM Management Authority (MA) 102 issues a request to a DM Server 104, for example, to provision data connectivity parameters in one or more devices. The DM Server 104 sends a Server-initiated Notification to the UE 106, which establishes a DM Session with the DM Server 104, which queries the UE for current settings (which may include device-specific extensions). The DM Server 104 sends DM commands to adjust the UE's configuration to conform to requirements established by the DM MA 102. The UE 106 and DM Server 104 end their DM Session, and the UE is able to access network data services using the configured connectivity parameters. The DM MA or the DM Server may store the connectivity parameters on a "smart card" or the like so that the UE can use them when the UE is consuming the parameters.

Approaches to updating the firmware in a UE exist in OMA. For example, version 1.0 of a candidate enabler for a Firmware Update MO specifies MO(s) and their necessary behavior to support the updating of firmware in mobile devices. It will be understood that "firmware" is computer programming instructions that are usually used from a read-only memory (ROM) and that "software" is computer programming instructions that are usually used from a read/write memory. OMA's candidate Firmware Update MO uses the OMA DM enabler and supports alternate download mechanisms (such as OMA Download Over the Air (OTA)). This represents the interface between a DM Client in the UE and a DM Server required to manage the update of a mobile device's firmware.

OMA also has a Software Component Management Object (SCOMO) work item under development. With DM and SCOMO, it may eventually be possible remotely to install all needed software that an MA has decided is a full working set of applications.

Nevertheless, DM and SCOMO cannot take into account dependencies between applications, e.g., applications that an end user may download. There is not a standardized way for the UE to notify or request an installation of a software component that is needed by an application.

SUMMARY

In accordance with aspects of this invention, there is provided a method of operating a user equipment (UE) in a communication system that also includes a computer server. The method includes the steps of determining, by the UE, whether a software component is missing from the UE; and if a software component is determined as missing, sending a request for the missing software component to the computer server. In accordance with further aspects, the server determines the missing component based on configuration information that may be included in the request, such as the UE manufacturer, model, and/or version. The software dependencies in the UE can be investigated further by sending the UE a request for additional information that may include an inventory list of applications existent in the UE. Based on the request and/or additional information, at least one software component can be provided to the UE, possibly based on an applicable security policy.

In accordance with further aspects of this invention, a communication system includes a computer server, and a UE that is selectively able to communicate with the computer server and that includes a processor configured to execute software components existent in the UE. The UE is configured to send, if the processor determines that a software component is missing from the UE, a first request to the server to provide the missing software component; and the server is configured to decide, based on the first request, at least one software component to be provided to the UE.

DETAILED DESCRIPTION

As an initial matter, it should be understood that this description is written mainly in terms of OMA DM merely for simplicity of explanation. This description should not be interpreted as being limited to OMA DM. Independent of the mechanism used to identify a software component that is missing from a UE and download the same to the UE, it is preferable that the UE be able to give notice and request installation of the missing software component, and it is advantageous for that ability to conform to a standardized mechanism.

The inventors have recognized, as just one example, that OMA DM SCOMO, which generally enables a MA 102 to manage the software in a UE 106, can also enable a DM Server 104 and the MA 102 to get an inventory list of applications existing in the UE 106. The MA 102 and DM Server 104 can also obtain, using the OMA DM protocol for example, other configuration information, such as the UE's manufacturer, the UE's model, version, OS, etc. Such an inventory list can include identification information for the installed software components and for their versions. It will be understood that whether a DM Server 104 is actually permitted to get such a list can depend on an applicable security policy. As described in more detail below, an MA 102 can then decide, based on the configuration information, which may include the inventory list, received by the DM Server 104, which software applications, or more generally software components, should be modified, added, upgraded, or deleted, and arrange with the DM Server 104 for the UE 106 to be correspondingly arranged.

It will be understood that in an OMA DM environment, decision making is usually not done at the level of the DM Server; the MA makes decisions and then DM Servers carry out the operations. A UE can also have several MAs and respective DM Servers. For example, a mobile phone may be managed by a MA of a wireless network operator via several of the operator's OMA DM Servers, and by a MA of the phone user's employer via other OMA DM Servers. The operator can be responsible for managing connectivity for the operator's network, including keeping a roaming list of the cheapest roaming settings that is valid for the user's subscription to the operator. The employer can be responsible for tracking and management of all corporate applications on the device. The phone's user may also decide, completely unknown to any of the OMA DM Servers, to download and install other software on the device.

Figure 1:
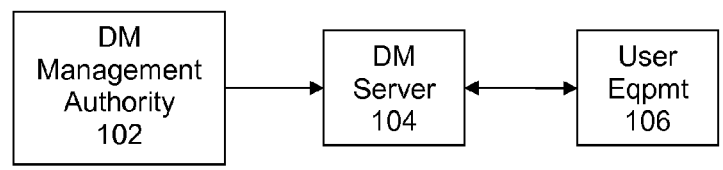
FIG. 1 depicts a DM Management Authority, a DM server, and a UE.
Figure 2:
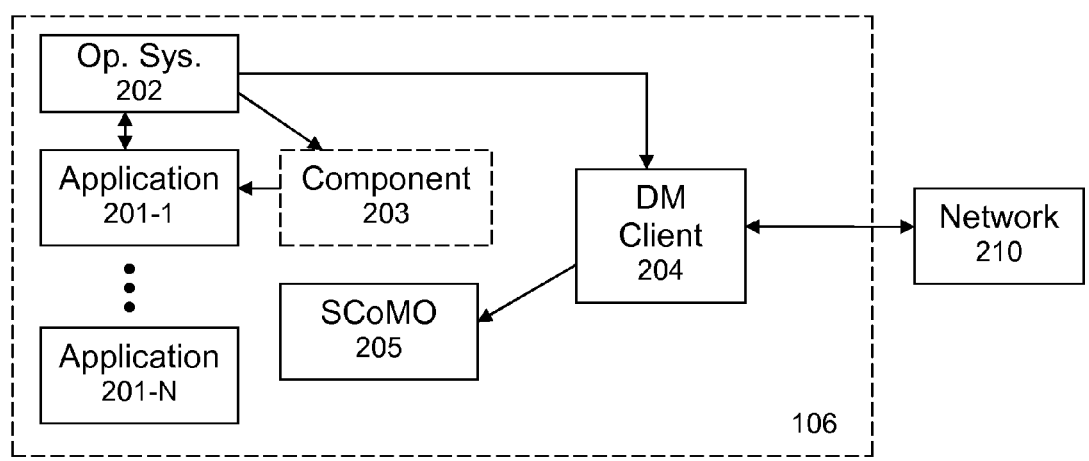
FIG. 2 depicts applications, an operating system, a missing component, a DM Client, and a Management Object existent in a UE in communication with a network.

Referring to FIG. 2, existent in the UE 106 are a number of applications 201-1, . . . ,201-N. An application 201 requests the OS 202, or an application manager, to load a software component 203, such as a dynamic linked library (DLL), for example, or more generally, any file that supports a specific interface Identifier. If the component 203 is missing from the UE 106 (as indicated by its dashed lines), the OS sends a request to a DM Client 204, enabling the DM Client 204 to send a request to a DM Server 104 in a network 210, if such a request is allowed by applicable security policies. In its request, the DM Client 204 includes information on the UE's type of device and model, version, and possibly the local language that is used in the UE.

The DM server 104 may use the configuration information on behalf of the MA 102 to determine whether the DM Server can fix the problem, e.g., respond with the missing component 203. If the DM Server 104 needs more information from the UE 106, then the DM Server 104 may send a request to the DM Client 204 for an inventory list, e.g., from a SCOMO client 205, for all applications and components that are installed in the UE 106. If the DM Server 104 has a solution, then the DM Server 104 can use the DM Client 204 and the SCOMO client 205 to provide the missing component, e.g., upgrade to the correct version or perform a new installation of the missing component 203.

If this kind of automatic solution, i.e., responding to requests without user interaction, is not supported by the DM Server 104, then the DM server 104 can use the DM Client 204 to query the user of the UE 106 about how to proceed. It could be, for example, that the user is informed that no solution exists, or the DM Server 104 could push a web link, such as a uniform resource locator (URL) address, to the user, enabling the user to buy and/or install the missing component 203 manually.

If the DM Server 104 is able to update or install the missing component automatically, then the DM Client 204 or the SCOMO client 205 can inform the OS 202 that the component 203 has been installed. In that case, the OS 202 can inform the application 201 where to find the missing component 203, i.e., its memory location. It will be understood that, in this case, the application 201 does not need to be aware that the UE did not have the component 203 at that time the application 201 requested it.

Figure 3:
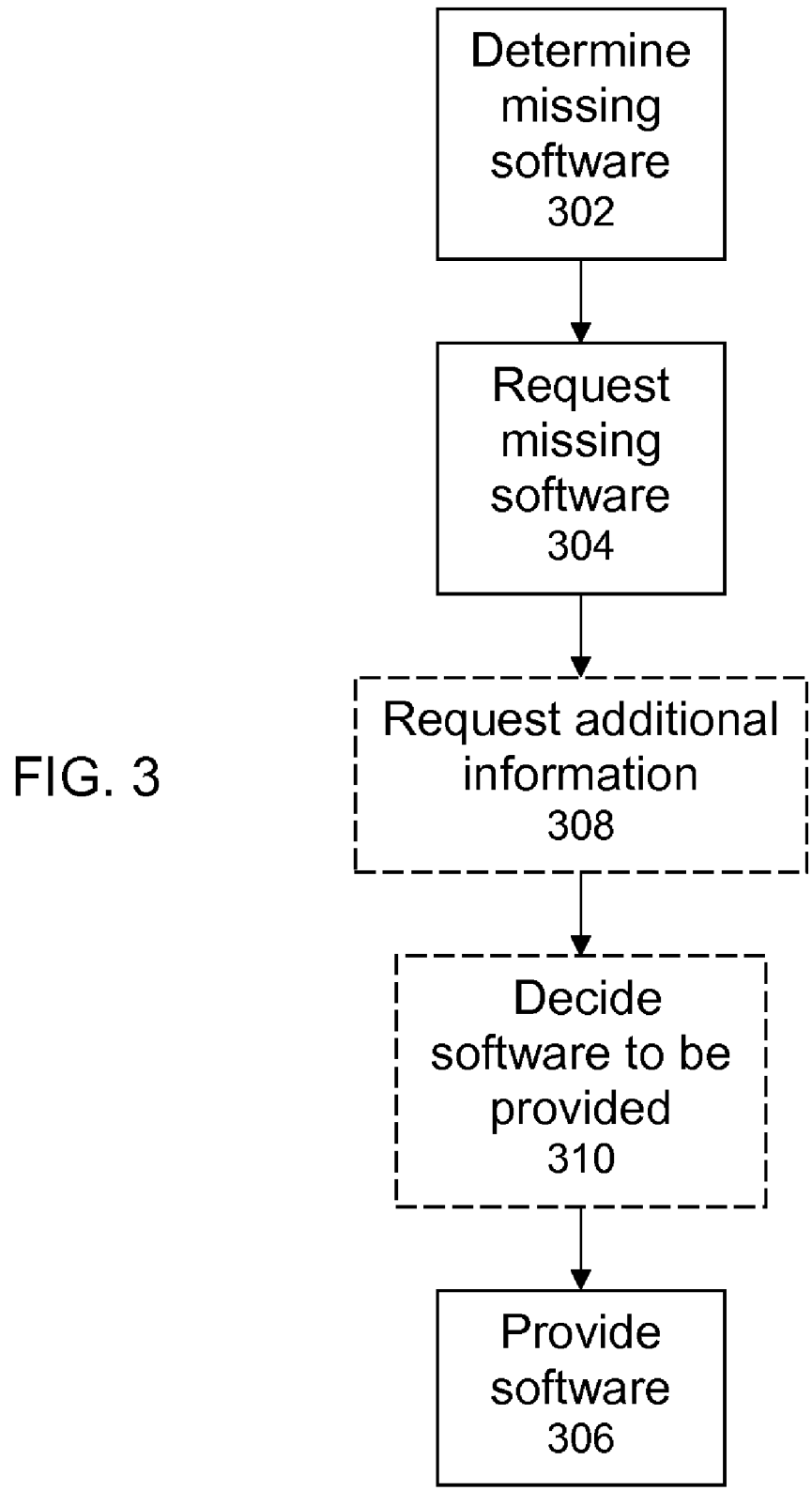
FIG. 3 is a flow chart of a method of operating a UE.

FIG. 3 is a flow chart of a method of operating a UE 106 in a communication system that is in accordance with this invention. The UE preferably determines (step 302) for itself that a software component is missing when for example the end user tries to start an application. In a Microsoft Windows Mobile environment for example, an application may request a particular DLL when the application starts up that is necessary for the application to run. As another example, an application may expect to see a particular application program interface (API) on starting up that is necessary. DLLs and similar components often have the same name even while they are different versions, and it is thus possible for one version of a component to be replaced by a different version having the same name when a new application is installed. If the UE determines that the application has not successfully started, it is usually the OS 202 that identifies the missing software component.

If a component is determined as missing, the UE 106 sends a request (step 304) to a server in the system, such as a DM Server 104 and MA 102, notifying the Server that the component (e.g., the DLL) is missing. The request sent by the UE preferably includes UE configuration information, e.g., at least one of the UE manufacturer, model, version, operating system type, and operating system version. Based on the request, the Server 104, either by itself or in cooperation with the MA 102, may simply be able to provide (step 306) the missing component to the UE. It will be understood that sending the request can depend on applicable security policies.

It is generally preferable that such a request be made according to a standardized protocol, although this is not necessary. One way for the UE to send a standardized request to the MA 102 is via OMA DM using the Generic alert feature. Via a Generic alert message, the UE 106 can initiate an OMA DM Session to an MA and send the name of the missing file and that that file is needed to a DM Server and the MA.

In an OMA DM environment, a DM Server 104 may need to obtain additional information, which may include an inventory list of some or all of the software components that are existent in the UE 106. For example, DM Server 104 can use OMA SCOMO, which generally enables a MA 102 to manage the software in a UE 106, to send a request (step 308) to the UE for the additional information. SCOMO is one example of a way that a DM Server can get a list of all installed applications and components that exist in the UE. Based on the information, a DM MA 102 can then decide (step 310) whether the request is supported and what possibilities there are to provide the file to that end user and device, depending on UE security policies, business agreements, subscription provisions, etc.

As described above, the list can include identification information for the installed software components and for their versions, including identifier, name, version, state, and status of every component in the UE. It will be appreciated that the information can be obtained via mechanisms other than SCOMO; for example, it can be obtained as a dump of all existing files in the UE's file system, or via the Java Specification Request (JSR) or Open Services Gateway Initiative (OSGi) specifications. As described below, OSGi and Java JSR-232 are similar enough in functionality to OMA SCOMO to be interchangeable for purposes of this application.

The server or MA may itself be able to provide the missing component to the UE 106, or the UE's end user may need to purchase it first. It may even be impossible to fix the missing resource at all, e.g., the end user may be informed via a suitable information message that the UE or application is no longer supported and that a newer device or application should be purchased. If the server/MA has the missing resource or an upgrade, it may be provided online directly and seamlessly to the UE, such that the end user detects merely a slow start-up of the application. As alternatives, the end user may be asked for permission first before the missing component is provided, or the UE may fail to launch the application but be able to request and install the missing component and then the end user may start the application again. For example, the UE may be sent a link to a website that the end user can access via a web browser to install the requested software component.

The UE may ask the end user for permission to send the request that a software component is missing. A security policy may define whether the end user is to be notified of the request, asked for permission to send the request, or not notified at all. For example, the end user of a UE provided in a corporate environment may not be notified at all if for example the UE's anti-virus components needs to be updated, but a UE that is not locked to an operator would probably request the end user's permission first before it would send a request to a server, such as a DM Server or MA. When a UE 106 determines that a software component is missing when starting up an application, the UE would read the local security policy to determine whether an automatic request should be made (i.e., a request without asking for end-user permission), how the end user should be made aware of the request (if at all), and finally which MA the UE has permission to send the request to. The UE may be managed by several MAs, but only one or a few of them may have permission to receive the request.

In an OMA DM environment, the DM Client 204, i.e., a DM Management Entity (ME) in the UE 106, could handle the security permission interaction with the end user. For example, the ME may present via the UE's user interface (UI) a question, such as "The application you started is missing a component. Should I try to download it automatically (Y/N) ?" If the end user chooses to allow the download, e.g., by responding to a suitable alert with a keypress or other action, then the UE 106 sends a notification request to the MA 102. This request may identify the software component(s) that is(are) missing, and may also include optional versioning information and optional language information.

If for example the missing software component has a cost, the MA 102 could use the OMA DM User Interaction commands to ask the end user if he/she wants to purchase the missing file. For a UE that supports many languages, the MA should be able to ask that question in the language that the end user has configured as the default language. In addition, the missing component might include UI components, and therefore it could be good for the MA to deliver the missing component in the UE's default language.

In any event in response to the UE's request, the server, such as the DM Server 104 and/or the MA 102, configures the UE 106 by providing (step 306) the missing software component(s), if possible. The missing components may be provided in any suitable fashion, for example, via OMA DM SCOMO. Another delivery mechanism that the can be used is specified in Java Specification Request (JSR) JSR-232, which describes using OMA DM for the OTA protocol. It will be understood that JSR-232 was specified before the OMA DM SCOMO specification was released, but JSR-232 used a pre-release version of the SCOMO specification. The artisan will understand that it is also possible to define a suitable missing-software request separately from the SCOMO and JSR-232 specifications.

Moreover, independent of whether the missing-software request is defined in OMA DM SCOMO or JSR-232 or separately, the request can be defined as an OMA DM Generic Alert. The ME initiates an OMA DM Session and sends such a missing-software Generic Alert. The DM Server 104 would then decide how to handle that request. The DM Server 104 could, for example, use either OMA DM SCOMO or JSR-232 to initiate an installation of the missing software component(s).

An exemplary definition of a suitable missing-software OMA DM Generic Alert message is as follows:

```
<Alert>
    <CmdID>2</CmdID>
    <Data>1226</Data>      <!-- Generic Alert -->
    <Item>
                <!--The URI of the installed application that can't run without this -->
        <Source><LocURI>./Inventory/Deployd/25 </LocURI></Source>
        <Meta>
            <Type xmlns="syncml:metinf">
                Reversed-Domain-Name:
org.openmobilealliance.softwarecomponent.request
            </Type>
            <Format xmlns="syncml:metinf">char</Format>
            <Mark xmlns="syncml:metinf">critical</Mark>       <!-- Optional -->
        </Meta>
        <Data>
            ericsson.mp3player.jar <!--The missing software component -->
        </Data>
    </Item>
</Alert>
```

Figure 4:
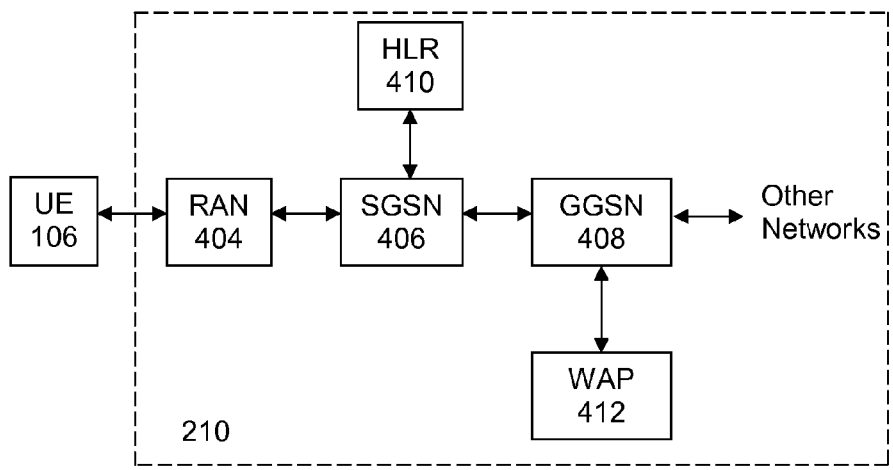
FIG. 4 is a block diagram of a communication system.

FIG. 4 is a block diagram of a communication system that can employ UEs capable of requesting missing-software downloads as described in this application. It will be understood that the UE may also connect to a network such as the internet via wireless local area networking (WLAN) such as IEEE 802.11, WiMAX (IEEE 802.16), etc., and in addition to the blocks shown in FIG. 4, the UE may use a 3GPP interworking WLAN. A UE 106 communicates with a network 210, which typically includes a radio access network (RAN) 404, such as a GSM/EDGE network, and core-network entities, including a servicing GPRS support node (SGSN) 406, a gateway GPRS support node (GGSN) 408, and a home location register (HLR) 410. The GGSN 408 communicates with other networks, such as the internet and public switched telephone networks, and other entities, such as a WAP infrastructure 412. The RAN 404 typically includes one or more base stations (BSs) and base station controllers, or Node Bs and radio network controllers (RNCs), that are conventional. The RNCs control various radio network functions, including for example radio access bearer setup, diversity handover among BSs, etc. More generally, each RNC directs calls to and from a UE via the appropriate BSs, which communicate with each other through downlink (i.e., base-to-mobile or forward) and uplink (i.e., mobile-to-base or reverse) channels. Each BS serves a geographical area that is divided into one or more cell(s) and is typically coupled to its corresponding RNC by dedicated telephone lines, optical fiber links, microwave links, etc. The core-network entities are adapted to handle many types of data. In a typical GSM/EDGE network, packet data protocol (PDP) contexts for administering data flows are set up, or activated, in the GGSN 408 in response to requests from the UE 106. It will be understood that a UE can also connect to the network via wireless local area network access.

Figure 5:
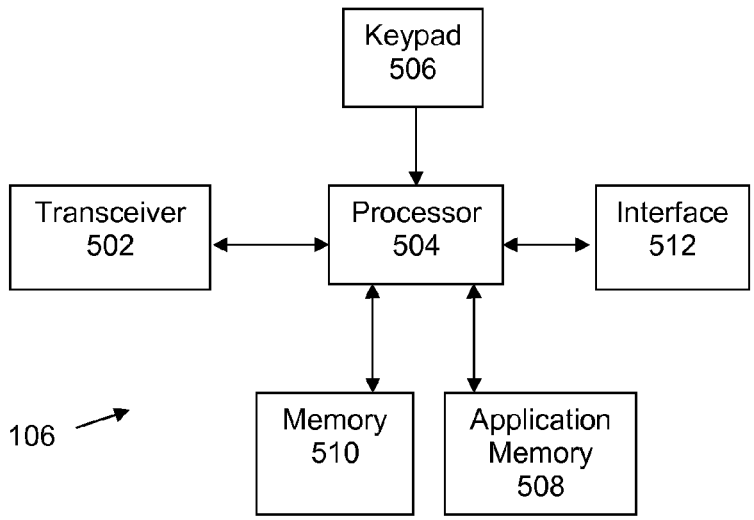
FIG. 5 is a block diagram of a communication device.

FIG. 5 is a block diagram of a communication device 106, including a suitable transceiver 502 for exchanging radio signals with BSs in the RAN 404. Information carried by those signals is handled by a processor 504, which may include one or more sub-processors, and which executes one or more software applications to carry out the operations of the device 106 according to the MOs described above. User input to the terminal is provided through a keypad 506 or other device. Software applications may be stored in a suitable application memory 508, and the device may also download and/or cache desired information in a suitable memory 510. The device 106 also includes an interface 512 that can be used to connect other components, such as a computer, keyboard, etc., to the device 106.

This invention has many advantages. For example, no other standardized solution to the problem of missing software components in UEs exists today. For another example, existing standards may be used to minimize the impact of implementation changes.

The invention described here can be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of operating a user equipment (UE) in a communication system that includes a computer server, comprising the steps of:
    determining, by the UE, that an application, which uses a software component that supports a specific interface identifier, has not successfully started and identifying the software component missing from the UE;
    if the software component is determined as missing,
        sending, by an operating system or an application manager of the UE, an internal request to a client of the UE;
        sending, by the client, a first request for the missing software component to the computer server; and
        accessing and installing the software component according to the first request.

2. The method of claim 1, wherein the first request includes configuration information for the UE, and the configuration information includes at least one of the UE manufacturer, model, version, operating system type, and operating system version.

3. The method of claim 1, further comprising the step of sending a second request for additional information to the UE, wherein the additional information includes an inventory list of software components existent in the UE.

4. The method of claim 3, wherein the inventory list includes identification and version information for the existent software components, and the computer server is a Device Management (DM) Server.

5. The method of claim 3, further comprising the step of deciding, based on at least the additional information, at least one software component to be provided to the UE.

6. The method of claim 5, wherein the computer server is a Device Management (DM) Server, and further comprising the step of determining whether the DM Server is permitted to obtain the inventory list based on a security policy.

7. The method of claim 5, further comprising the step of providing a software component to the UE according to the deciding step.

8. The method of claim 5, wherein the deciding step is carried out by a Management Authority and a Device Management Server.

9. The method of claim 3, wherein the step of sending the first request comprises notifying a Management Authority (MA) of the missing software component.

10. The method of claim 9, further comprising the step of deciding, by the MA, at least one software component to be provided to the UE.

11. A communication system, comprising:
    a computer server; and
    a user equipment (UE) that is selectively able to communicate with the computer server and that includes a processor configured to execute software components existent in the UE;
    wherein the UE is configured to send, if the processor determines that an application that uses a software component that supports a specific interface identifier has not successfully started and identifies the software component missing from the UE, an internal request by an operating system or an application manager to a client of the UE, and a first request by the client to the server for the missing software component; and to access and install the missing software component; and the server is configured to decide, based on the first request, the missing software component to be provided to the UE.

12. The system of claim 11, wherein the first request includes configuration information for the UE, and the configuration information includes at least one of the UE manufacturer, model, version, operating system type, and operating system version.

13. The system of claim 11, wherein the server is configured to send a second request for additional information to the UE, and the additional information includes an inventory list of software components existent in the UE.

14. The system of claim 13, wherein the inventory list includes identification and version information for the existent applications.

15. The system of claim 13, wherein the server is at least one of a Device Management (DM) Authority and a DM Server.

16. The system of claim 15, wherein at least one of the DM Authority and the DM Server is configured to provide to the UE, based on at least the additional information, the software component determined as missing.

17. The system of claim 16, wherein the software component determined as missing is provided based on a security policy.

* * * * *